United States Patent
Imark et al.

(10) Patent No.: US 11,153,008 B1
(45) Date of Patent: Oct. 19, 2021

(54) DETERMINATION OF A DISCONNECT RESPONSE METRIC FOR AN OPTICAL DEVICE

(71) Applicant: Hewlett Packard Enterprise Development LP, Houston, TX (US)

(72) Inventors: Robert R. Imark, Fort Collins, CO (US); Brian S. Birk, Salem, OR (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/946,078

(22) Filed: Jun. 5, 2020

(51) Int. Cl.
*H04B 10/00* (2013.01)
*H04B 10/077* (2013.01)

(52) U.S. Cl.
CPC .................... *H04B 10/077* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,557,437 A * | 9/1996 | Sakai | ............... | H04B 10/075 398/136 |
| 5,790,285 A * | 8/1998 | Mock | ............... | H04B 10/07 356/73.1 |
| 5,956,168 A * | 9/1999 | Levinson | ............... | H04B 10/2589 398/41 |
| 6,222,668 B1 * | 4/2001 | Dutrisac | ............... | H04B 10/077 359/337 |
| 6,587,974 B1 * | 7/2003 | Majd | ............... | H04B 10/03 370/253 |
| 7,130,537 B1 | 10/2006 | Maxham | | |
| 9,459,978 B2 * | 10/2016 | Fritzsche | ............... | G06F 11/2294 |
| 9,577,759 B2 | 2/2017 | Aronson et al. | | |
| 10,225,073 B1 * | 3/2019 | Martens | ............... | G01R 29/0871 |
| 2001/0021044 A1 * | 9/2001 | Lim | ............... | H04B 10/0731 398/18 |
| 2002/0130667 A1 * | 9/2002 | Noe | ............... | G01R 31/11 324/534 |
| 2004/0091271 A1 * | 5/2004 | Fishman | ............... | H04B 10/07 398/139 |
| 2004/0190897 A1 | 9/2004 | Satou et al. | | |
| 2007/0101215 A1 * | 5/2007 | Holmqvist | ............... | G01R 31/2834 714/724 |
| 2008/0159737 A1 * | 7/2008 | Noble | ............... | H04B 10/0773 398/16 |
| 2012/0237213 A1 * | 9/2012 | Yin | ............... | H04B 10/071 398/28 |

(Continued)

*Primary Examiner* — Agustin Bello
(74) *Attorney, Agent, or Firm* — Hewlett Packard Enterprise Patent Department

(57) ABSTRACT

Examples described herein relate to method for measuring a disconnect response time. The method includes discontinuing, in response to a determining that a disconnect response metric test is to be initiated, transmission of a test optical signal by a test device to a DUT coupled to the test device, wherein the DUT is to discontinue transmission of a response optical signal to the test device upon detection of a loss of the test optical signal. Further, a loss of the response optical signal by may be detected by the test device. Furthermore, a disconnect response metric of the DUT may be determined by the test device based on a time of discontinuation of the transmission of the test optical signal and a time of detection of the loss of the response optical signal.

20 Claims, 5 Drawing Sheets

(56) References Cited

U.S. PATENT DOCUMENTS

| | | | |
|---|---|---|---|
| 2013/0049765 A1 | 2/2013 | Cheung et al. | |
| 2014/0133845 A1* | 5/2014 | Dahlfort | H04B 10/0791 |
| | | | 398/12 |
| 2014/0193150 A1* | 7/2014 | Mukai | H04J 14/0267 |
| | | | 398/67 |
| 2014/0250328 A1* | 9/2014 | Schnizler | G01R 31/3177 |
| | | | 714/31 |
| 2016/0337034 A1* | 11/2016 | Ruchet | H04B 10/2581 |
| 2019/0261072 A1* | 8/2019 | Fonseca | H04B 10/0773 |
| 2020/0028765 A1* | 1/2020 | Schmogrow | H04J 14/0216 |
| 2020/0044734 A1* | 2/2020 | Parkin | H04Q 11/0066 |
| 2021/0058153 A1* | 2/2021 | Magri | H04B 10/0779 |

* cited by examiner

US 11,153,008 B1

DETERMINATION OF A DISCONNECT RESPONSE METRIC FOR AN OPTICAL DEVICE

BACKGROUND

An optical communication system generally provides communication over longer distances with higher bandwidth using smaller cable width (or diameter) in comparison to communication systems using electrical wires. In the optical communication system, a light generated by a light source (e.g., a laser) may be communicated from a first optical device (e.g., a source optical device or an optical transceiver) to a second optical device via an optical waveguide (e.g., a fiber optical cable).

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
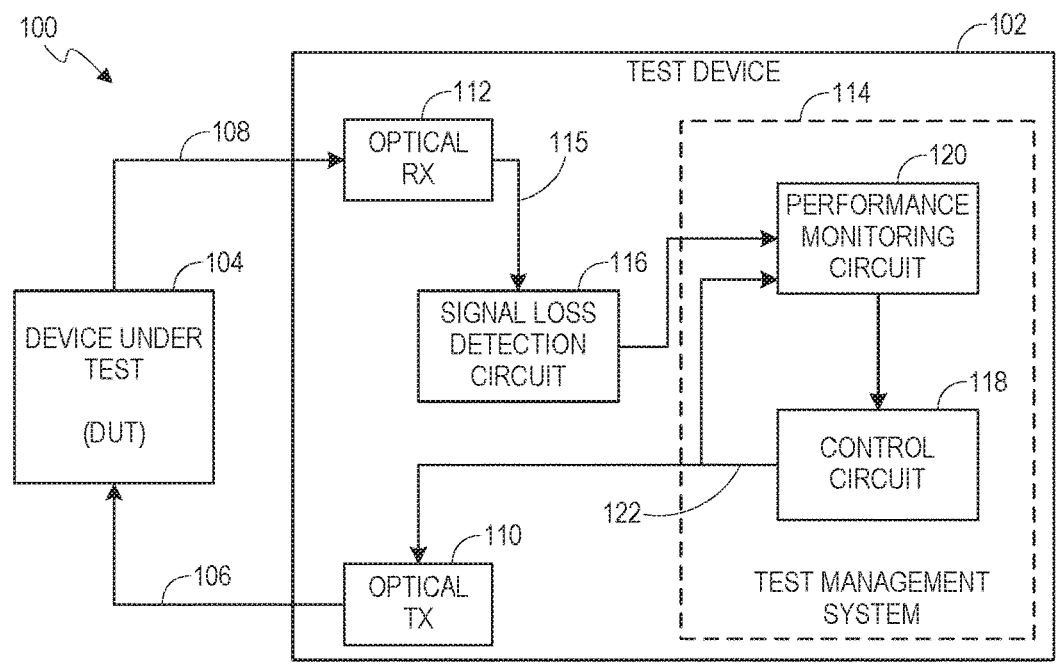
FIG. 1 depicts a test set-up including a test device coupled to a device under test (DUT), in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements may be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

An optical communication system generally provides communication over longer distances with higher bandwidth using smaller cable width (or diameter) in comparison to communication systems using electrical wires. In the optical communication system, a light generated by a light source (e.g., a laser) may be communicated from a first optical device (e.g., a source optical device or an optical transceiver) to a second optical device via an optical waveguide, for example, a fiber optic cable.

Typically, in optical communication systems, high intensity lasers are used as light sources. Such high intensity lasers may be dangerous if light generated by these lasers impinges on a portion of a human body. For example, if light from such lasers is pointed toward or at an eye for a certain period, such light may cause severe damage to the eye including blindness. In the optical communication system, such occurrences may arise if the fiber optic cable or connection provided by the fiber optic cable between two optical devices is broken and one of the two optical devices continues to inject light in the fiber optic cable via a respective laser. One common method to ensure or confirm the optical communication system is safe (e.g., connection between two optical devices via the optical fiber is not broken) is by detecting whether the laser of a source optical device is connected to the fiber optic cable with a photodetector at a recipient optical device (e.g., detecting whether optical signals from the laser of the source optical device are received by the recipient optical device). Further, certain optical transceivers may have internal logic to disable operation of an internal optical transmitter in response to detection of a loss of an optical signal transmission such that no light is transmitted through the optical fiber (e.g. when the connection is broken).

In addition to testing for safe operation during development of the optical devices that transmit light (e.g., optical transceivers), it is a common practice to conduct experiments or tests to test or otherwise evaluate a disconnect response time (also commonly referred to as an unplug response time) and signal power level. The terms "disconnect response time" or "unplug response time" may refer to a duration or time period between a detection of a loss of an optical signal transmission by an optical device and disabling the operation of an optical transmitter of the optical device in response to the detection of the loss of the optical signal transmission. Therefore, a faster (e.g., shorter) disconnect response time is generally desirable. In some examples, a parameter such as the disconnect response time may be a specification metric for an optical component. Accordingly, improving accuracy of measuring of such a specification metric is also desirable.

Existing techniques of measuring the disconnect response time typically involve several optical components such as an oscilloscope, an optical signal splitter, and a power meter. As will be understood, use of several such optical components may cause optical losses and the resulting measurements may not be accurate. For example, such measurements using the abovementioned optical components may provide good results for high power optical signals, for example, 25G non-return-to-zero (NRZ). However, for optical signals at higher speeds, for example, 53G pulse-amplitude modulation 4-level (PAM4), the signal level may decrease and the current method of measuring the disconnect response time using several optical components such as the optical signal splitter, the oscilloscope, and the power meter may not provide satisfactory results.

Accordingly, in accordance with aspects of the present disclosure, improved systems and methods for measuring a disconnect response time are presented. Such systems and methods can include discontinuing, in response to a determination that a disconnect response metric test is to be initiated, transmission of a test optical signal by a test device to a device under test (DUT) (e.g., an optical device being tested) coupled to the test device, wherein the DUT is to discontinue transmission of a response optical signal to the test device upon detection of a loss of the test optical signal. Further, a loss of the response optical signal by may be detected by the test device. Furthermore, a disconnect response metric of the DUT may be determined by the test device based on a time of discontinuation of the transmission of the test optical signal and a time of detection of the loss of the response optical signal, wherein the disconnect response metric is indicative of a duration that the DUT has taken to discontinue the transmission of the response optical signal after the discontinuation of the transmission of the test optical signal.

As will be appreciated, the method and the test device, in accordance with aspects of the present disclosure, may provide a simpler set-up for determining the disconnect response metric of a DUT in comparison to prior techniques. As such, the method and the test device presented herein may not require costly equipment such as the oscilloscope, the optical signal splitter, and/or the power meter to measure the disconnect response metric. This not only reduces cost of a test set-up but also reduces the complexity of connecting such multiple devices and taking measurements accordingly. Further, since no additional optical devices other than the test device are used in the proposed method, optical losses are minimized and the disconnect response metric is more accurately determined in comparison to the prior techniques. Further, the disconnect response metric is determined as a number of clock cycles between a time of discontinuation of the transmission of the test optical signal and a time of detection of the loss of the optical signal internally within the test device. Accordingly, any human errors that could have occurred in prior techniques in taking in taking reading of the as the oscilloscope and the power meter may be avoided in the present method of determining the disconnect response metric using the proposed test device.

Referring now to the drawings, in FIG. 1, a test set-up 100 (e.g., a testing rig) is depicted, in accordance with an example. The test set-up 100 of FIG. 1 may include a test device 102 coupled to a DUT 104. The test device 102 may be coupled to the DUT 104 to measure a performance parameter, for example, a disconnect response metric (described later) of the DUT 104. In some examples, during development of the DUT 104, the test device 102 may be used to perform a test/experiment to determine the disconnect response metric of the DUT 104.

The DUT 104 may be an optical device capable of receiving and/or transmitting light. In some examples, the DUT 104 may be an optical transceiver. The DUT 104 when deployed in an optical communication system (not shown), may be coupled to another optical device (not shown, hereinafter referred to as connected device) in the optical communication system via light carrying media (e.g., fiber optic cables). The DUT 104 may transmit light to the connected device and/or receive the light from the connected device during its operation. In some examples, although not shown in FIG. 1, the DUT 104 may include an optical receiver that receives light from the connected device, and an optical transmitter from which the DUT 104 may transmit the light to the connected device.

However, if the light carrying media that couples the DUT 104 and the connected device has been unplugged, the DUT 104 is designed to detect a loss of an optical signal associated with the light at the optical receiver of the DUT 104. If the loss of the optical signal is detected by the DUT 104 at its optical receiver, the DUT 104 may discontinue or disable transmission of an optical signal (e.g., light) to the connected device as quickly as possible. The DUT 104 may discontinue the transmission of the optical signal or light by turning-off its optical transmitter. Such an action of turning-off the optical transmitter of the DUT 104 in response to the detection of the loss of the optical signal from at its optical receiver may avoid or minimize any safety hazard. It may be noted that the present disclosure is not limited with respect to how the DUT 104 performs the detection of the loss of the optical signal and subsequent discontinuation of the transmission of the optical signal. A time period or duration that the DUT 104 may take to discontinue the transmission of the optical signal after detection of the loss of the optical signal at its optical receiver is referred to as a disconnect response time of the DUT 104. In some examples, a parameter such as the disconnect response time may be a specification metric for the DUT 104.

The test device 102 presented in accordance with various aspects of the present disclosure aids in accurately determining a disconnect response metric that corresponds to or is indicative of the disconnect response time of the DUT 104. The test device 102 may be coupled to the DUT 104 via light carrying media 106, 108. The light carrying media 106, 108 may represent any medium capable of allowing a passage of an optical signal (e.g., light) between the test device 102 and the DUT 104. By way of example, the light carrying media 106, 108 may be optical waveguides, such as, fiber optic cables. In some examples, the test device 102 may include one or more of an optical transmitter 110, an optical receiver 112, a test management system 114, and a signal-loss detection circuit 116.

The optical transmitter 110 may generate a test optical signal under control of the test management system 114. The optical transmitter 110 may include, in some examples, a light source (not shown) such as a laser and electronics (not shown) to control the operation of the light source. The test management system 114 may control an operation of the optical transmitter 110 to enable or disable generation of the test optical signal. In the test set-up 100 of FIG. 1, the test device 102 may be coupled to the DUT 104 such that the optical transmitter 110 of the test device 102 is coupled to the optical receiver (not shown) of the DUT 104, and the optical receiver 112 of the test device 102 is coupled to the optical transmitter of the DUT 104.

In some examples, the test management system 114 may determine that a disconnect response metric test is to be initiated based on a test initiation command. In some examples, the test initiation command may be generated internally within the test management system 114 in various conditions, including but not limited to, in response to a request from an external computing system connected to the test device 102. The test device 102 may then enter into a particular operating state, user initiated test command, or combinations thereof.

Upon determining that the disconnect response time metric is to be initiated, the test management system 102 may enable transmission of a test optical signal to the DUT 104 via the optical transmitter 110. When the test optical signal is received by the DUT 104, the DUT 104 may respond to the test device 102 by transmitting a response optical signal to the test device 102. It is to be noted that the terms "test optical signal" and "response optical signal" both are optical/light signals. In particular, the "test optical signal" is an optical signal that is sent to the DUT 104 from the test device 102, whereas the "response optical signal" is an optical signal that is sent to the test device 102 from the DUT 104 in response to receipt of the "test optical signal" by the DUT 104. Further, the optical receiver 112 may receive the response optical signal from the DUT 104. The optical receiver 112 may include, in some examples, optical to electrical converter devices, for example, one or more photo diodes. The optical receiver 112 may generate an electrical signal corresponding to or equivalent of the response optical signal.

The signal-loss detection circuit 116 may be disposed within the test device 102 and electrically coupled to the optical receiver 112 to receive the electrical signal equivalent of the response optical signal. In some examples, the electrical signal generated by the optical receiver 112 may be a digital signal having a pattern of ones and zeros. Based on the electrical signal received from the optical receiver 112, the signal-loss detection circuit 116 may detect whether the optical receiver 112 is receiving the response optical signal from the DUT 104. In some examples, the signal-loss detection circuit 116 may include a processor, a microcontroller, application-specific integrated circuit (ASIC), a field programmable gate array (FPGA), other hardware devices, an integrated circuit (IC), a control logic, electronic circuits, or combinations thereof. The signal-loss detection circuit 116 may implement various techniques, including but not limited to, a DC-balance error detection technique, a run-length error detection technique, a gain error detection technique, or combinations thereof, to determine the loss of the response optical signal.

By way of example, in the DC-balance error detection technique, the number of ones and zeroes in the electrical signal are averaged over any sequence of N bits to determine an average value. Multiple such average values are determined and compared with each other to ascertain if these average values differ by no more than a threshold number of bits. If the average values differ by more than the threshold number of bits, the signal-loss detection circuit 116 may detect that the response optical signal is lost. Further, in the run-length error detection technique, the signal-loss detection circuit 116 may ascertain if the number of consecutive ones or zeroes in the electrical signal is less than a threshold run-length. If the number of consecutive ones or zeroes is identified to be greater than or equal to the threshold run-length, the signal-loss detection circuit 116 may detect that the response optical signal is lost. Furthermore, in gain error detection technique, the signal-loss detection circuit 116 may determine if a gain of the optical receiver 112 remains in a predetermined range. If it is determined that the gain is outside of the predetermined range, the signal-loss detection circuit 116 may detect that the response optical signal is lost.

The test management system 114 is disposed in the test device 102 and is coupled to the optical transmitter 110 and the signal-loss detection circuit 116. The test management system 114 may include a control circuit 118 and a performance monitoring circuit 120. In some examples, the control circuit 118 and a performance monitoring circuit 120 may include a processor, a microcontroller, application-specific integrated circuit (ASIC), a field programmable gate array (FPGA), other hardware devices, an integrated circuit (IC), a control logic, electronic circuits including a number of electronic components, or combinations thereof, to perform operations (described further below) intended to be performed by the control circuit 118 and the performance monitoring circuit 120. Although the test management system 114 is shown to include the control circuit 118 and the performance monitoring circuit 120 as two separate units, in some examples, the control circuit 118 and the performance monitoring circuit 120 may be combined into a single unit/chip, without limiting the scope of the present disclosure. In certain other examples, the control circuit 118 and the performance monitoring circuit 120 may be distributed across more than two units without limiting the scope of the present disclosure. Moreover, in certain examples, the all of the signal-loss detection circuit 116, the control circuit 118, and the performance monitoring circuit 120 may form a part of the test management system 114, without limiting the scope of the present disclosure.

The control circuit 118 may be coupled to the optical transmitter 110 via a transmitter control link 122. The transmitter control link 122 may include a set of conductors to communicate control signals from the control circuit 118 to the optical transmitter 110. In some examples, the control circuit 118 may control the operation of the optical transmitter 110 via the control signals to control transmission of the test optical signal to the DUT 104. For example, the control circuit 118 may enable transmission of the test optical signal to the DUT 104 by turning-on the optical transmitter 110. The control circuit 118 may turn-on the optical transmitter 110 by activating a transmitter power-on signal on the transmitter control link 122. Further, the control circuit 118 may disable or discontinue the transmission of the test optical signal to the DUT 104 by turning-off the optical transmitter 110. The control circuit may turn-off the optical transmitter 110 by activating a transmitter power-down (TPD) signal (see FIG. 2) on the transmitter control link 122. When the TPD signal is activated, the optical transmitter 110 may be turned-off and the transmission of the test optical signal to the DUT 104 may be discontinued from the test device 102.

In some examples, as previously noted, the DUT 104 may be designed to disable or discontinue transmission of the response optical signal to the test device 102 if the DUT 104 detects no incoming test optical signal from the test device 102. As previously noted, based on the electrical generated by the optical receiver 112, the signal-loss detection circuit 116 may detect whether the optical receiver 112 is receiving the response optical signal from the DUT 104. If the signal-loss detection circuit 116 detects the loss of the response optical signal at the optical receiver 112, the signal-loss detection circuit 116 may activate a link-down (LD) signal (see FIG. 3) on a signal detection link 115.

The performance monitoring circuit 120 may be coupled to the signal-loss detection circuit 116 and the control circuit 118 via the signal detection link 115 and the transmitter control link 122, respectively. The performance monitoring circuit 120 may receive the TPD signal from the control circuit 118 and the LD signal from the signal-loss detection circuit 116, respectively. Further, in some examples, the performance monitoring circuit 120 may receive a clock signal (see FIG. 4) from a clock source (not shown). In some examples, the clock source 124 may be a dedicated clock signal generation unit for the test device 102 that may supply the cock signal to other components such as the control circuit 118. In some other examples, the clock signal may be generated by the control circuit 118 and supplied to the performance monitoring circuit 120. In certain other examples, the clock signal may be generated internally within the performance monitoring circuit 120.

In accordance with the aspects of the present disclosure, the performance monitoring circuit 120 may determine a disconnect response metric of the DUT 104 based on a time of discontinuation of the transmission of the test optical signal and a time of detection of the loss of the response optical signal. In some examples, the performance monitoring circuit 120 may determine the disconnect response metric as a number of clock cycles between a first time (e.g., the time when the TPD signal is activated) and a second time (e.g., the time when the LD signal is activated). The disconnect response metric is indicative of a time that the DUT 104 has taken to discontinue the transmission of the response optical signal since the discontinuation of the transmission of the test optical signal by the test device 102. Additional details of the operations performed by the test management system 114 and details of determining the disconnect response metric will be described in conjunction with methods described in FIGS. 8-10.

As will be appreciated, use of the test device 102 may provide the simpler example set-up 100 for determining the disconnect response metric of the DUT 104 in comparison to prior techniques. As such, the test device 102 presented in accordance with aspect of the present disclosure does not require costly equipment such as the oscilloscope, the optical signal splitter, and the power meter to measure the disconnect response metric. This not only reduces cost of the test set-up 100 but also reduces the complexity of connecting such multiple devices and taking measurements. Further, since no additional optical devices other than the test device 102 are used in the proposed method, optical losses are minimized and the disconnect response metric of the DUT 104 is more accurately determined in comparison to the prior techniques. Further, the disconnect response metric is determined as a number of clock cycles between a time of discontinuation of the transmission of the test optical signal and a time of detection of the loss of the response optical signal internally within the test device 102. Accordingly, any human errors that could have occurred in prior techniques in taking in taking reading of the as the oscilloscope and the power meter may be avoided.

Figure 2:
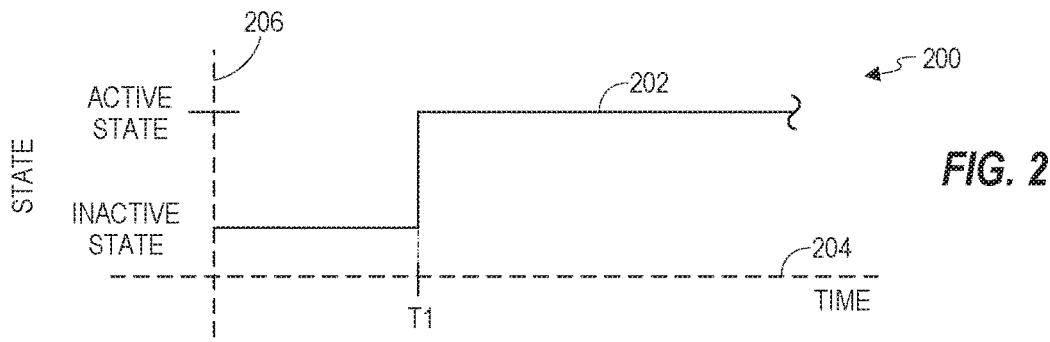
FIG. 2 depicts a graphical representation showing a waveform of a transmitter power-down (TPD) signal, in accordance with an example.

Referring now to FIG. 2, a graphical representation 200 depicting a waveform of a TPD signal 202 is shown, in accordance with an example. The TPD signal 202 may be a current signal or a voltage signal. An X-axis 204 and a Y-axis 206 in the graphical representation 200 may respectively represent time and a state of the TPD signal. As depicted in FIG. 2, the TPD signal 202 is activated at time T1 by the control circuit 118. Accordingly, the TPD signal 202 may transition from an inactive state to an active state at the time T1. The terms "active state" and the "inactive state" may each represent a magnitude, a level (e.g., one or zero), or a polarity of the TPD signal 202. Although the active state is shown to have higher magnitude/level than the inactive state in FIG. 2, in certain other examples, the active state may be defined to have lower magnitude/level than the inactive state.

Figure 3:
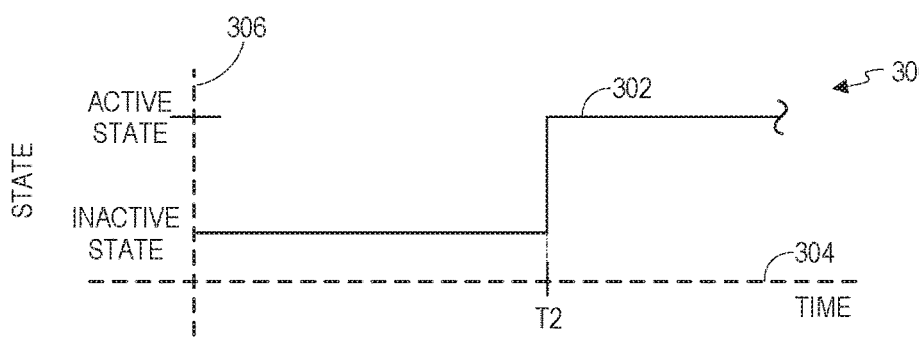
FIG. 3 depicts a graphical representation showing a waveform of a link-down (LD) signal, in accordance with an example.

Further, in FIG. 3, a graphical representation 300 depicting a waveform of an LD signal 302 is shown, in accordance with an example. The LD signal 302 may be a current signal or a voltage signal. An X-axis 304 and a Y-axis 306 in the graphical representation 300 may respectively represent time and a state of the LD signal 302. As depicted in FIG. 3, the LD signal 302 is activated at time T2 which is later than time T1 by the signal-loss detection circuit 116. Accordingly, the LD signal 302 may transition to an active state from an inactive state at the time T2. The terms "active state" and the "inactive state" may each represent a magnitude, a level (e.g., one or zero), or a polarity of the LD signal 302. Although the active state is shown to have higher magnitude/level than the inactive state in FIG. 3, in certain other examples, the active state may be defined to have lower magnitude/level than the inactive state.

Figure 4:
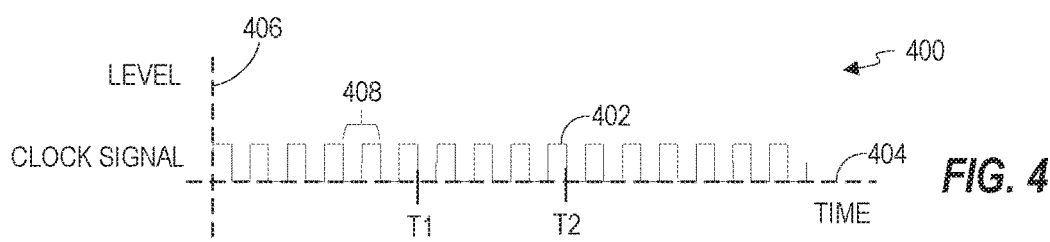
FIG. 4 depicts a graphical representation showing a waveform of a clock signal, in accordance with an example.

Furthermore, in FIG. 4, a graphical representation 400 depicting a waveform of a clock signal 402 is shown, in accordance with an example. As previously noted, the clock signal 402 may be received by the performance monitoring circuit 120 or generated internally within the performance monitoring circuit 120. Further, the clock signal 402 may be used by the performance monitoring circuit 120 to determine the disconnect response metric for the DUT 104. An X-axis 404 and a Y-axis 406 in the graphical representation 300 may respectively represent time and a level of the clock signal 402. Further, a portion of the clock signal 402 marked with the reference numeral 408 may represent a clock cycle. Accordingly, in FIG. 4, the clock signal 402 is shown to have several such clock cycles.

Figure 5:
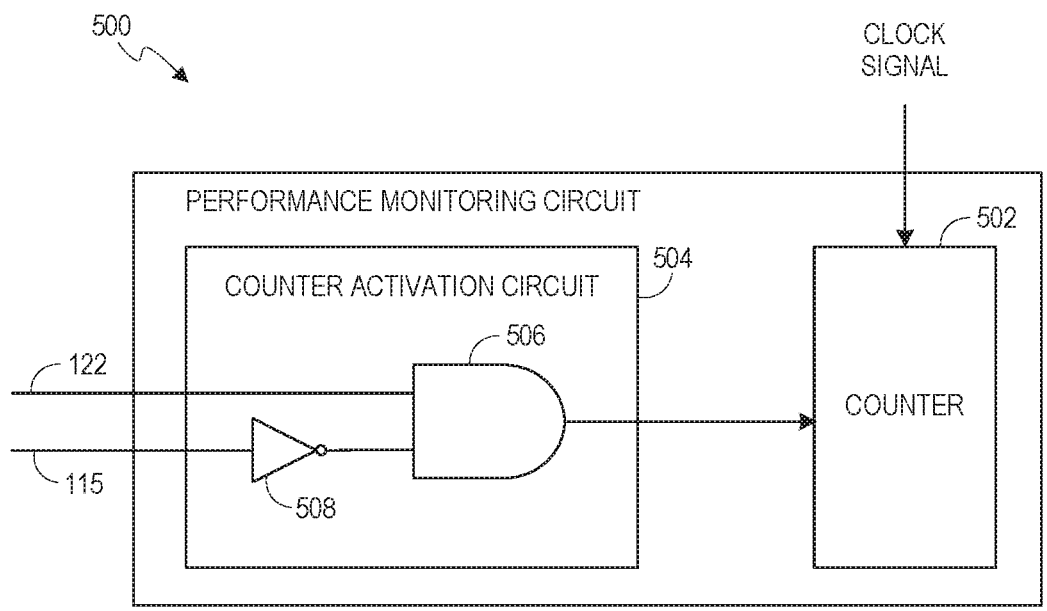
FIG. 5 depicts a schematic diagram of a performance monitoring circuit, in accordance with an example.

Referring now to FIG. 5, a schematic diagram of an example performance monitoring circuit 500 is depicted. The performance monitoring circuit 500 may represent an example implementation of the performance monitoring circuit 120 of FIG. 1. As depicted in FIG. 5, the performance monitoring circuit 500 may include a counter 502 and a counter activation circuit 504. The counter 502 may receive the clock signal (described in FIG. 1). Further, the counter 502 may also receive a counter activation signal from the counter activation circuit 504. The counter 502 may include a digital circuit that may count number of clock cycles/pulses of the clock signal (e.g., the clock signal 402 of FIG. 4) when the counter activation signal is active. In some examples, the counter 502 may include electronics including but not limited to, logic gates, memory elements, latches, flip-flops, or combinations thereof. In certain other examples, the counter 502 may be implemented via processor executable instructions.

The counter activation circuit 504 may be coupled to the counter 502. The counter activation circuit 504 may activate the counter activation signal to cause the counter 502 to count the number of clock cycles. In some examples, the counter activation circuit 504 may activate or deactivate the counter activation signal based on the TPD signal received from the control circuit 118 over the transmitter control link 122 and the LD signal from the signal-loss detection circuit 116 over the signal detection link 115. In some examples, the counter activation circuit 504 may include one or more logic gates to generate the counter activation signal based on the TPD signal and the LD signal. For example, the counter activation circuit 504 may include an AND gate 506, and a NOT gate 508 connected to one of inputs of the AND gate 506. The TPD signal may be directly supplied to one input terminal of the AND gate while the LD signal is applied to another input terminal of the AND gate 506 via the NOT gate 508 as depicted in FIG. 5. Further, an output terminal of the AND gate may be connected to the counter 502.

Figure 6:
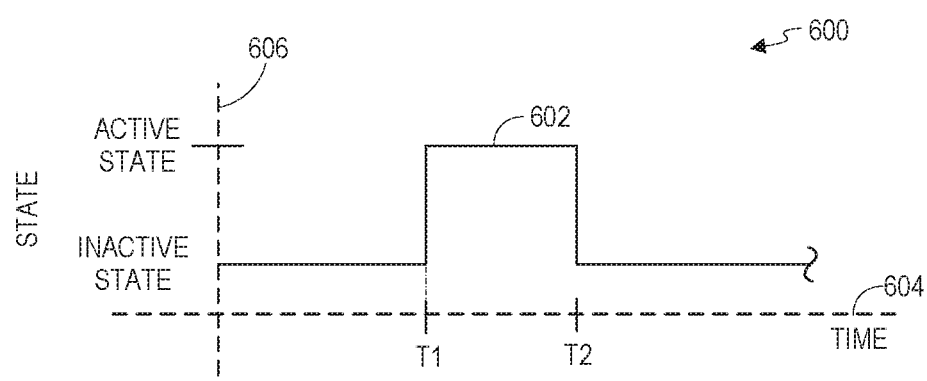
FIG. 6 depicts a graphical representation showing a waveform of a counter activation signal, in accordance with an example.

Accordingly, during operation of the test device 102, when the TPD signal is at the active state (indicative of the transmission of the test optical signal is discontinued) and the LD signal is at the inactive state (indicative of non-detection of the loss of the response signal at the optical receiver 112), the counter activation signal may be activated by the counter activation circuit 504. As previously noted, the TPD signal transitions to the active state at time T1 and the LD signal remains at the inactive state until time T2. Accordingly, the counter activation signal may remain activated for a duration between time T1 and time T2 (see FIG. 6). Referring now to FIG. 6, a graphical representation 600 depicting a waveform of a counter activation signal 602 is shown, in accordance with an example. The counter activation signal 602 may be a current signal or a voltage signal. An X-axis 604 and a Y-axis 606 in the graphical representation 600 may respectively represent time and a state of the counter activation signal 602. As depicted in FIG. 6 and as previously described, the counter activation signal 602 is activated between time T1 and time T2. The terms "active state" and the "inactive state" may each represent a magnitude, a level (e.g., one or zero), or a polarity of the counter activation signal 602. Although the active state is shown to have higher magnitude/level than the inactive state in FIG. 6, in certain other examples, the active state may be defined to have lower magnitude/level than the inactive state.

Referring again to FIG. 5, in some examples, when the counter activation signal 602 is in the active state, the counter 502 may count number of clock cycles. More particularly, the counter 502 may count the number of clock cycles between time T1 and T2 during which the counter activation signal 602 is in the active state. The counter activation signal 602 may transition to the inactive state when the LD signal is transitioned to the active state at time T2. Accordingly, the counter 502 may stop counting the clock cycles when the counter activation signal 602 attains the inactive state and retains a count of the number of clock cycles as a counter value between time T1 and time T2. Additional details of counting the number of clock cycles will be described in conjunction with FIG. 10. The number of clock cycles between time T1 and time T2 may be referred to as a disconnect response metric as the number of clock cycles between time T1 and time T2 may be indicative of the a disconnect response time of the DUT 104.

Figure 7:
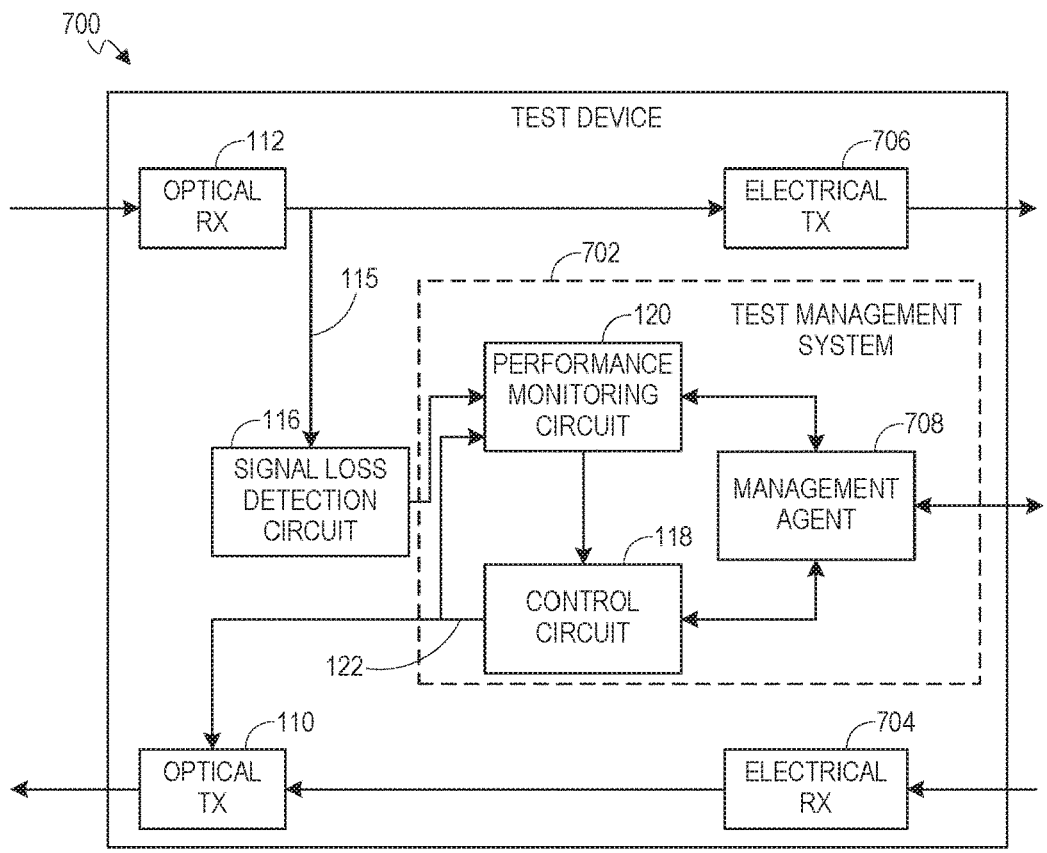
FIG. 7 depicts a test device, in accordance with an example.

Moving now to FIG. 7, a test device 700 in accordance with one example is presented. The test device 700 of FIG. 7 may be representative of one example of the test device 102 of FIG. 1 and include several components that are already described in FIG. 1. Such components are referenced using same reference numerals and description of which is not repeated herein. For example, the test device 700 may also include the optical transmitter 110, the optical receiver 112, and the signal-loss detection circuit 116. Further, the test device 700 may include a test management system 702 that is an example of the test management system 114 of FIG. 1 and includes the control circuit 118 and the performance monitoring circuit 120 described in FIG. 1. In addition, the test device 700 of FIG. 7 is shown to include an electrical receiver 704 and an electrical transmitter 706. Further, the test management system 702 may additionally include a management agent 708. The electrical receiver 704, the electrical transmitter 706, and the management agent 708 may aid the test device 700 in communicating with an external computing system and/or device. The test device 700 may be coupled to a DUT (not shown), such as, the DUT 104 to determine a disconnect response time of the DUT in a similar fashion as described with reference to the test device 102 of FIG. 1.

The electrical receiver 702 may be coupled to the optical transmitter 110 as depicted in FIG. 7. The electrical receiver 702 may receive an electrical signal from an external device (not shown) to be transmitted by the test device 700. In some examples, the optical transmitter 110 may modulate an optical signal (e.g., light) based on the electrical signal received from the electrical receiver 702. Accordingly, in some examples, the test optical signal may be a modulated optical signal generated by the optical transmitter 110 by modulating the light based on the electrical signal received from the electrical receiver 702. Further, in some examples, the electrical transmitter 704 may be coupled to the optical receiver 112. The electrical transmitter 704 may receive an electrical signal from the optical receiver 112. The electrical signal received from the optical receiver 112 may be an electrical equivalent of an optical signal (e.g., the response optical signal) received by the optical receiver 112. The electrical transmitter 704 may be used to transmit the electrical signal to any the external device, in some examples.

Further, in some examples, the management agent 708 may enable communication between the test device 700 and any external computing system (e.g., computer system, not shown) connected to the test device 700. The management agent 708 may be a communication medium via which the external computing system may access the test management system 702. For example, the management agent 708 may allow the external computing system to communicate with the control circuit 118 and the performance monitoring circuit 120. In some examples, upon receiving a request to access the counter value, the management agent 708 may access the counter value from the performance monitoring circuit 120 (e.g., from the counter 502) and communicate the counter value to the external computing system. In addition, in some examples, the management agent 708 may also communicate status of various signals such as the TPD signal, the LD signal, and/or the counter activation signal to the external signal for aiding monitoring by the external computing system.

Figure 8:
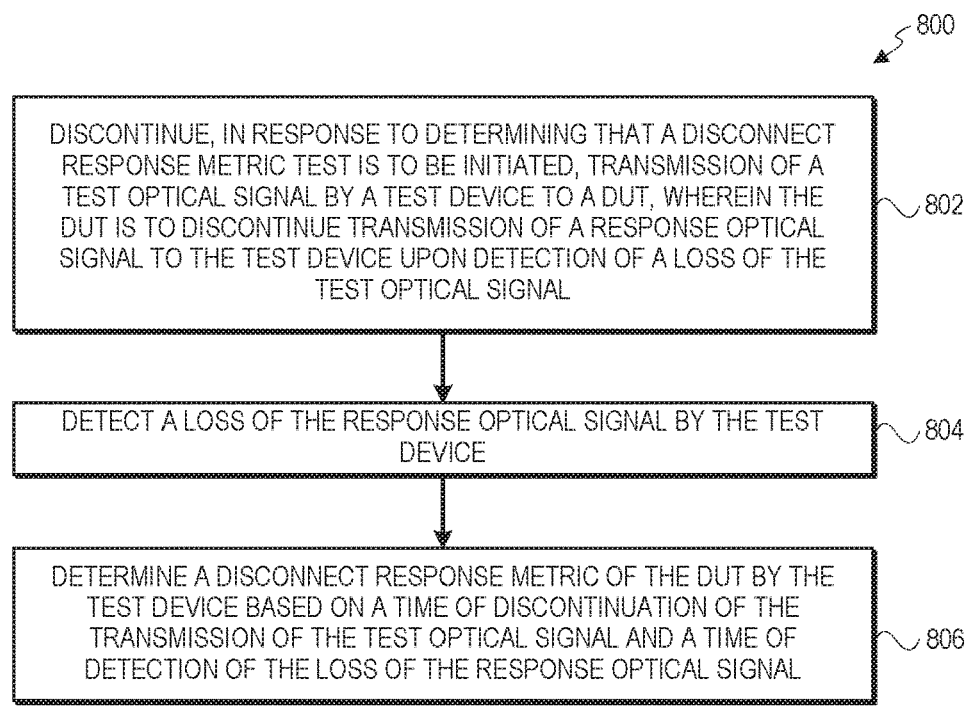
FIG. 8 is a flow diagram depicting a method for determining a disconnect response metric, in accordance with an example.

FIG. 8 is a flow diagram depicting a method 800 for determining a disconnect response metric is presented, in accordance with an example. For illustration purposes, the method 800 is described with reference to the test-setup 100 of FIG. 1. As will be appreciated, the method 800 is also applicable to the test device 700 of FIG. 7, without limiting the scope of the present disclosure.

At block 802, the test device 102 may discontinue transmission of a test optical signal the DUT 104 in response to determining that a disconnect response metric test is to be initiated. In some examples, the test device 102 may determine that the test initiation command needs to be initiated based on a test initiation command. The test initiation command may be generated by the control circuit 118 of the test device 102 to initiate a test to determine the disconnect metric of the DUT 104. The control circuit 118 may generate the test initiation command in various conditions, including but not limited to, in response to request from an external computing system connected to the test device 102, the test device 102 entering into a particular operating state, user initiated test command, or combinations thereof. The transmission of a test optical signal may be discontinued by turning-off the optical transmitter 110 of the test device 102. In some examples, the control circuit 118 may activate the TPD signal to turn-off the optical transmitter 110. The DUT 104 may detect an absence of the test optical signal at its optical receiver. In response to the detection of the absence of the optical signal, the DUT 104 may discontinue transmission of the response optical signal to the test device 102.

Further, at block 804, the test device 102 may detect a loss of the response optical signal. For example, the loss of the response optical signal at the optical receiver 112 of the test device 102 may be detected by the signal-loss detection circuit 116. Additional details of detecting the loss of the response optical signal is described in conjunction with FIGS. 1 and 9. Furthermore, at block 806, the test device 102 may determine the disconnect response metric of the DUT 104 based on a time of discontinuation of the transmission of the test optical signal and a time of detection of the loss of the response optical signal. The disconnect response metric may be indicative of a time (also known a disconnect response time) that the DUT 104 has taken to discontinue the transmission of the response optical signal since the discontinuation of the transmission of the test optical signal. In some examples, the disconnect response metric may be the number of clock cycles between the time when the transmission of the test optical signal is discontinued and the time when the loss of the response optical signal is detected. Additional details of determining the disconnect response metric and counting the number of clock cycles is described in conjunction with FIGS. 9 and 10.

Figure 9:
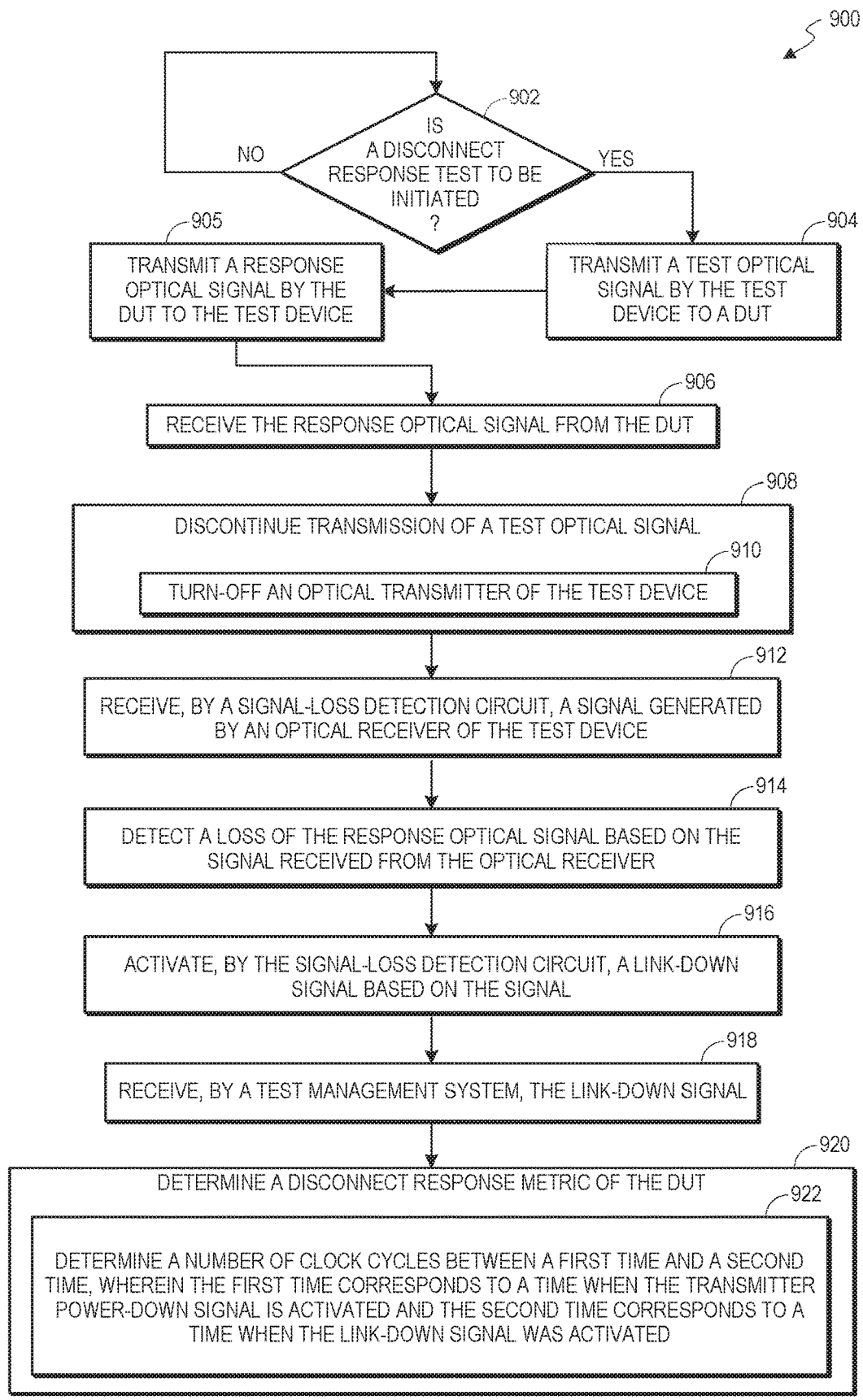
FIG. 9 is a flow diagram depicting a method for determining a disconnect response metric, in accordance with another example.

Referring now to FIG. 9, a flow diagram depicting a method 900 for determining the disconnect response metric is presented, in accordance with another example. For illustration purposes, the method 900 is described in conjunction with the test-setup 100 of FIG. 1. As will be appreciated, the method 900 is also applicable to the test device 700 of FIG. 7, without limiting the scope of the present disclosure. In addition, certain blocks of the method 900 may provide additional details of the blocks of the method 800 of FIG. 8.

At block 902, a check may be performed to determine whether a disconnect response metric test is to be initiated. In some examples, the control circuit 118 may perform a check to determine whether the disconnect response metric test is to be started in response to one or more of a request from an external computing system connected to the test device 102, the test device 102 entering into a particular operating state, a user initiated test command, or combinations thereof. In certain examples, the control circuit 118 may generate a test initiation command in response to one or more of the request from the external computing system connected to the test device 102, determining that the test device 102 has entered into a particular operating state, receipt of a user initiated test command, or combinations thereof. At step 902, if it is determined that the disconnect response metric test is not to be started, the control circuit 118 may continue to perform the check at block 902 again. However, at block 902, if it is determined that the disconnect response metric test is to be started, at block 904, a test optical signal may be transmitted to the DUT 104 from the test device 102. The test optical signal may be transmitted to the DUT 104 via the optical transmitter 110 under the control of the control circuit 118. In some examples, the control circuit 118 may activate a transmitter power-on signal over one of the conductors of the transmitter control link 122 to turn-on the optical transmitter 110, thereby enabling the transmission of the test optical signal to the DUT 104.

Upon receipt of the receipt of the test optical signal by the DUT 104, the DUT 104, at block 905, may transmit a response optical signal to the test device 102. The DUT 104 may transmit the response optical signal to the test device via the optical transmitter of the DUT 104. Accordingly, at block 906, the response optical signal may be received by the test optical device 102 at its optical receiver 112. Further, at block 908, the transmission of the test optical signal may be discontinued from the test device 102. In some examples, to aid in the discontinuation of the transmission of the test optical signal, at block 910, the control circuit 118 may turn-off the optical transmitter 110 by activating the TPD signal on the transmitter control link 122. An example TPD signal 202 is depicted in FIG. 2. For example, the TPD signal may be activated by the control circuit 118 at time T1 (see FIG. 2). When the TPD signal is activated, the optical transmitter 110 may be turned-off and the generation of the test optical signal may be disabled. Consequently, no test optical signal may be transmitted to the DUT 104.

Once the transmission of the test optical signal is discontinued by the test device 102, the DUT 104 may no longer receive the test optical signal. The DUT 104 may detect such absence of the test optical signal at its optical receiver and stop the transmission of the response optical signal to the test device 102. At block 912, the signal-loss detection circuit 116 may receive an electrical signal generated by the optical receiver 112 via the signal detection link 115. The electrical signal generated by the optical receiver 112 is an electrical equivalent of any optical signal received by the optical receiver 112. As will be appreciated, such electrical signal generated by the optical receiver 112 may be useful to detect whether the optical receiver 112 is receiving the response optical signal.

Accordingly, at block 914, the signal-loss detection circuit 116 may detect the loss of the response optical signal based on the electrical signal received from the optical receiver 112. As previously described, the signal-loss detection circuit 116 may implement various techniques, including but not limited to, the DC-balance error detection technique, the run-length error detection technique, the gain error detection technique, or combinations thereof, to determine whether reception of the response optical is lost at the optical receiver 112. In response to determining that the response optical signal is lost, the signal-loss detection circuit 116, at block 916, may activate the LD signal on the signal detection link 115. An example LD signal is depicted in FIG. 3. For example, the LD signal may be activated by the signal-loss detection circuit 116 at time T2 (see FIG. 2). Further, at block 918, the LD signal may be received by the test management system 114. In particular, the performance monitoring circuit 120 may receive the LD signal in the active state from the signal-loss detection circuit 116.

Further, at block 920, the performance monitoring circuit 120 may determine the disconnect response metric based on the TPD signal and the LD signal. Determination of the disconnect response metric at the block 920 may include determining a number of clock cycles between a first time (i.e., time T1) and a second time (i.e., time T2), wherein the first time corresponds to a time when the TPD signal is activated and the second time corresponds to a time when the LD signal was activated. In some examples, FIG. 10 depicts a method for determining the number of clock cycles.

Figure 10:
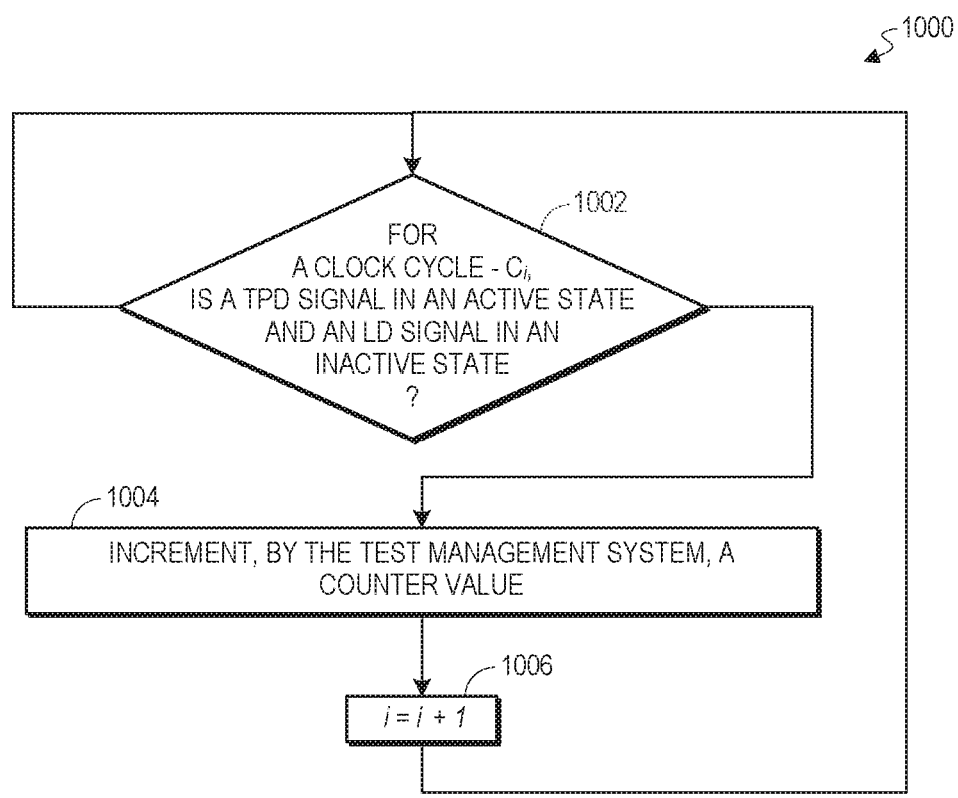
FIG. 10 is a flow diagram depicting a method for determining a number of clock cycles between a first time and a second time, in accordance with another example.

Referring now to FIG. 10, a flow diagram depicting a method 1000 for determining a number of clock cycles between the first time and the second time is presented, in accordance with another example. In some examples, the method 1000 may represent various method blocks for performing an operation at block 922 of the method 900 of FIG. 9. At block 1002, for each clock cycle (Cr), the performance monitoring circuit 120 may determine whether the TPD signal in the active state and the LD signal in the inactive state. The active state of the TPD signal may indicate that optical transmitter is turned-off and the inactive state of the LD signal may indicate that the loss of the response optical signal has not been detected. In one example, such check may be performed by the counter activation logic 504 of the performance monitoring circuit 500 (see FIG. 5) which is one example implementation of the performance monitoring circuit 120. At block 1002, if it is determined that the TPD signal is not in the active state or the LD signal is not in the inactive state, the check at block 1002 may be performed again. In some examples, the performance monitoring circuit 120 or 500 may continuously monitor the TPD signal and the LD signal to determine if the TPD signal in the active state and the LD signal in the inactive state.

At block 1002, if it is determined that the TPD signal in the active state and the LD signal in the inactive state, at block 1004, a counter value may be incremented by one. In one example, when the TPD signal in the active state and the LD signal in the inactive state the performance monitoring circuit 120 may activate the counter activation signal. The counter 502 may maintain the counter value which may be incremented by one when the counter activation signal is active for a given clock cycle. Further, at block 1006, a next clock cycle (i=i+1) is received by the performance monitoring circuit 120. Moreover, the operations performed at the blocks 1002, 1004 and 1006 may be repeated until it is determined that the TPD signal is not having the active state or the LD signal is not having the inactive state. As will be appreciated, in the method 1000 of FIG. 10, the number of clock cycles may be counted between time T1 and T2 during which the counter activation signal 602 is in the active state. When the counter activation signal 602 transitions to the inactive state at time T2, the counter 502 may stop counting the clock cycles and the counter value may be retained. In one example, the counter value retained by the counter 502 may be referred as the disconnect response metric that is indicative of a disconnect response time of the DUT 104.

As will be appreciated, use of the test device 102 may provide the simpler example set-up 100 for determining the disconnect response metric of the DUT 104 in comparison to prior techniques. As such, various methods of determining the disconnect response metric using the test device 102 presented in accordance with aspect of the present disclosure does not require costly equipment such as the oscilloscope, the optical signal splitter, and the power meter. This not only reduces cost of the test set-up 100 but also reduces the complexity of connecting such multiple devices and taking measurements. Further, since no additional optical devices other than the test device 102 are used in the proposed method, optical losses are minimized and the disconnect response metric of the DUT 104 is more accurately determined in comparison to the prior techniques. Further, the disconnect response metric is determined as a number of clock cycles between a time of discontinuation of the transmission of the test optical signal and a time of detection of the loss of the response optical signal internally within the test device 102. Accordingly, any human errors that could have occurred in prior techniques in taking in taking reading of the as the oscilloscope and the power meter may be avoided.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   discontinuing, in response to determining that a disconnect response metric test is to be initiated, transmission of a test optical signal by a test device to a device under test (DUT) coupled to the test device, wherein the DUT is to discontinue transmission of a response optical signal to the test device upon detection of a loss of the test optical signal;
   detecting a loss of the response optical signal by the test device; and
   determining, by the test device, a disconnect response metric of the DUT based on a time of discontinuation of the transmission of the test optical signal and a time of detection of the loss of the response optical signal, wherein the disconnect response metric is indicative of a duration that the DUT has taken to discontinue the transmission of the response optical signal after the discontinuation of the transmission of the test optical signal.

2. The method of claim 1, wherein the test device is an optical transceiver and the DUT is an optical transceiver separate from the test device.

3. The method of claim 1, further comprising:
   transmitting, by the test device, the test optical signal to the DUT prior to discontinuing transmission of the test optical signal; and
   transmitting, by the DUT, the response optical signal to the test device in response to receiving the test optical signal by the DUT.

4. The method of claim 1, wherein discontinuing the transmission of the test optical signal comprises turning-off an optical transmitter of the test device by activating a transmitter power-down signal to the optical transmitter by a test management system within the test device.

5. The method of claim 4, further comprising receiving, by a signal-loss detection circuit disposed within the test device, a signal generated by an optical receiver of the test device, wherein the a loss of the response optical signal is detected by the signal-loss detection circuit based on the signal generated by the optical receiver.

6. The method of claim 5, further comprising activating, by the signal-loss detection circuit, a link-down signal in response to detecting the loss of the response optical signal.

7. The method of claim 6, further comprising receiving, by the test management system, the link-down signal from the signal-loss detection circuit.

8. The method of claim 7, wherein determining the disconnect response metric comprises determining, by the test management system, a number of clock cycles between a first time and a second time, wherein the first time corresponds to a time when the transmitter power-down signal is activated and the second time corresponds to a time when the link-down signal was activated.

9. The method of claim 8, wherein determining the number of clock cycles comprises:
for a clock cycle of a clock signal supplied to the test management system:
  (a) determining, by the test management system, if the transmitter power-down signal is having an active state and the link-down signal is having an inactive state, wherein the active state of the transmitter power-down signal indicates that optical transmitter is turned-off and the inactive state of the link-down signal indicates that the loss of the response optical signal has not been detected; and
  (b) incrementing, by the test management system, a counter value in response to determining that the transmitter power-down signal is having the active state and the link-down signal is having the inactive state; and
repeating operations at (a) and (b) for a next clock cycle until the link-down signal attains the active state, wherein the active state of the link-down signal indicates that the loss of the response optical signal has been detected.

10. A test device, comprising:
an optical transmitter to transmit a test optical signal to a device under test (DUT);
an optical receiver to receive a response optical signal from the DUT;
a signal-loss detection circuit coupled to the optical receiver to detect a loss of the response optical signal at the optical receiver; and
a test management system coupled to the optical transmitter and the signal-loss detection circuit to:
  discontinue transmission of the test optical signal via the optical transmitter; and
  determine a disconnect response metric of the DUT based on a time of discontinuation of the transmission of the test optical signal and a time of detection of the loss of the response optical signal by the signal-loss detection circuit.

11. The test device of claim 10, wherein the DUT is an optical transceiver.

12. The test device of claim 10, wherein the test management system comprises:
a control circuit coupled to the optical transmitter, wherein the control circuit is to turn-off the optical transmitter by activating a transmitter power-down signal to the optical transmitter to discontinue transmission of the test optical signal; and
a performance monitoring circuit coupled to the control circuit, wherein the performance monitoring circuit is to receive the transmitter power-down signal.

13. The test device of claim 12, wherein the signal-loss detection circuit is to:

receive a signal generated by an optical receiver of the test device; and
activate a link-down signal in response to detecting the loss of the response optical signal based on the signal generated by an optical receiver.

14. The test device of claim 13, wherein the performance monitoring circuit is to receive the ink-down signal from the signal-loss detection circuit.

15. The test device of claim 14, wherein the performance monitoring circuit determines the disconnect response metric as a number of clock cycles between a first time and a second time, wherein the first time corresponds to a time when the transmitter power-down signal is activated and the second time corresponds to a time when the link-down signal was activated.

16. The test device of claim 15, wherein the performance monitoring circuit further comprises a counter activation circuit to activate a counter activation signal, for each clock cycle of a clock signal supplied to the performance monitoring circuit, when the transmitter power-down signal is having an active state and the link-down signal is having an inactive state, wherein the active state of the transmitter power-down signal indicates that optical transmitter is turned-off and the inactive state of the link-down signal indicates that the loss of the response optical signal has not been detected.

17. The test device of claim 16, wherein the performance monitoring circuit further comprises a counter coupled to the counter activation circuit, wherein the counter is to increment, for each clock cycle of a clock signal supplied to the performance monitoring circuit, a counter value when the counter activation signal is in an active state.

18. The test device of claim 17, wherein the test management system further comprising a management agent coupled to the performance monitoring circuit to communicate the counter value to an external computing system coupled to the test device.

19. A test management system, comprising:
a control circuit to discontinue transmission of the test optical signal via an optical transmitter of a test device, wherein the test device is coupled to the DUT;
a performance monitoring circuit coupled to the control circuit to determine a disconnect response metric of the DUT based on a time of discontinuation of the transmission of the test optical signal and a time of detection of the loss of the response optical signal by a signal-loss detection circuit coupled to the performance monitoring circuit.

20. The test management system of claim 19, the performance monitoring circuit further comprises:
a counter activation circuit to activate a counter activation signal, for each clock cycle of a clock signal supplied to the performance monitoring circuit, when a transmitter power-down signal generated by the control circuit is having an active state and a link-down signal generated by the signal-loss detection circuit is having an inactive state, wherein the active state of the transmitter power-down signal indicates that optical transmitter is turned-off and the inactive state of the link-down signal indicates that the loss of the response optical signal has not been detected; and
a counter coupled to the counter activation circuit, wherein the counter is to increment, for each clock cycle of a clock signal supplied to the performance monitoring circuit, a counter value when the counter activation signal is in an active state, wherein the counter value represents the disconnect response metric of the DUT.

* * * * *